E. R. JAGENBURG.
FRUIT AND VEGETABLE CUTTING MACHINE.
APPLICATION FILED AUG. 9, 1921.

1,418,443.

Patented June 6, 1922.
5 SHEETS—SHEET 1.

Fig. 1.

Inventor
E. R. Jagenburg

By C. P. Goepel
Attorney

E. R. JAGENBURG.
FRUIT AND VEGETABLE CUTTING MACHINE.
APPLICATION FILED AUG. 9, 1921.

1,418,443.

Patented June 6, 1922.
5 SHEETS—SHEET 3.

Inventor
E. R. Jagenburg
By
C. P. Goepel
Attorney

E. R. JAGENBURG.
FRUIT AND VEGETABLE CUTTING MACHINE.
APPLICATION FILED AUG. 9, 1921.

1,418,443.

Patented June 6, 1922.
5 SHEETS—SHEET 4.

E. R. JAGENBURG.
FRUIT AND VEGETABLE CUTTING MACHINE.
APPLICATION FILED AUG. 9, 1921.

1,418,443.

Patented June 6, 1922.

Inventor
E. R. Jagenburg
By
C. P. Goepel
Attorney

UNITED STATES PATENT OFFICE.

EUGENE ROBERT JAGENBURG, OF NEW YORK, N. Y., ASSIGNOR TO CROWN FRUIT & EXTRACT CO. INC., OF NEW YORK, N. Y., A CORPORATION OF NEW YORK.

FRUIT AND VEGETABLE CUTTING MACHINE.

1,418,443.  Specification of Letters Patent.  Patented June 6, 1922.

Application filed August 9, 1921. Serial No. 490,866.

*To all whom it may concern:*

Be it known that I, EUGENE ROBERT JA-GENBURG, a citizen of the United States, and a resident of Sea Gate, Long Island, county of Kings, city and State of New York, have invented certain new and useful Improvements in Fruit and Vegetable Cutting Machines, of which the following is a specification.

This invention relates to an improved fruit and vegetable cutting machine, and has for its primary object to provide a machine for rapidly cutting fruits or vegetables in large quantities into sections or portions of substantially uniform size.

In the manufacture of candies having fruit centers, such as peach, pineapple, or the like, it is desirable that the portions of the fruit shall be of the same size, so that each box or container for a predetermined quantity by weight shall contain the same number of pieces, whereby the necessity of weighing each box as it is filled may be obviated.

The present invention likewise comprehends a machine for this purpose which is so constructed that all of the original fruit flavor is retained, and to this end the fruit juices which are released in the cutting of the fruit are collected and sprayed under pressure upon the cut fruit, whereby the separation of the smaller particles of fruit from the larger portions which it is desired to utilize, is facilitated.

It is also an important object of the invention to provide mechanism for cutting the layers of fruit into cubes or sections which is so constructed and operated that there is practically no pressure by the cutting knives on the fruit which would tend to macerate or reduce the fruit to a pulpy mass.

In one embodiment of the invention, I provide two series of cutting knives or blades which are reciprocated through a cylinder in directions at right angles to each other. This cylinder is of sufficient capacity to contain a large number of superposed layers of the fruit, whereby the lowermost fruit layer will be forced downwardly by the combined weight of the other fruit layers upon the reciprocating knives.

It is also one of the objects of my invention to provide a cutting mechanism of this character, the several parts of which can be readily assembled or disassembled for the purpose of renewal or repair, and also to enable such parts to be easily cleaned whereby the apparatus may be kept in a thoroughly sanitary condition.

My present invention further contemplates the provision of a grading cylinder rotatably mounted with its axis at a longitudinal inclination and into one end of which the cut fruit or vegetable is fed. The wall of this cylinder is foraminous or provided with openings of predetermined size or shape through which the smaller particles of the fruit may pass, together with the fruit juices which are received in a tank or receptacle.

In connection with this cylinder, a spray pipe is employed and a suitable pump connected to the tank supplies the fruit juice to this pipe from which it is sprayed in a plurality of jets under pressure against the cut fruit and the wall of the cylinder. These jets facilitate the separation of the smaller fruit particles from those of uniform size and direct the same through the openings in the cylinder wall. The larger particles of fruit gravitate through the inclined cylinder and are discharged from the lower open end thereof into a suitable collecting receptacle.

It is also a further general object of my invention to provide a fruit or vegetable cutting apparatus as above characterized, which is of comparatively simple construction, positive and reliable in its operation and may be operated with relatively little power.

With the above and other objects in view, the invention consists in the improved form, construction and arrangement of the several parts, as will be hereinafter more fully described, illustrated in the accompanying drawings, and subsequently incorporated in the subjoined claims.

In the drawings, wherein I have disclosed one desirable and satisfactory embodiment of the invention, and in which similar reference characters designate corresponding parts throughout the several views.

Figure 1:
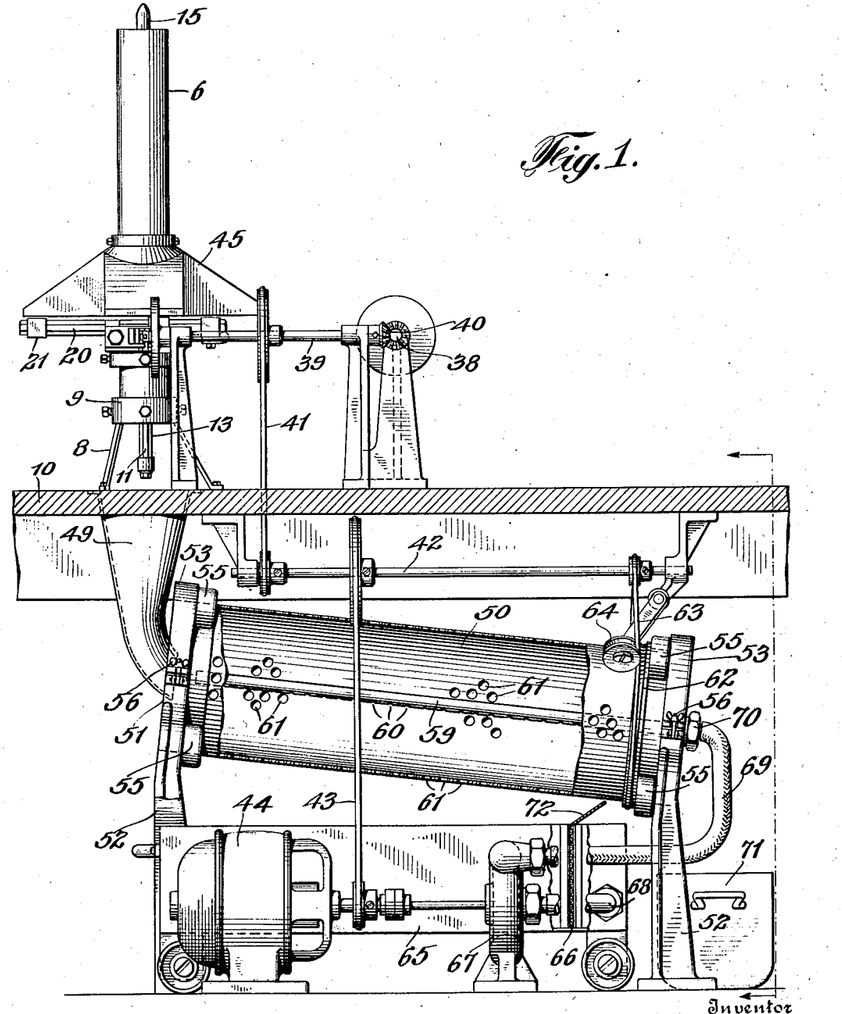
Figure 1 is a side elevation of the complete apparatus, the grading cylinder being partly in section.
Figure 2:
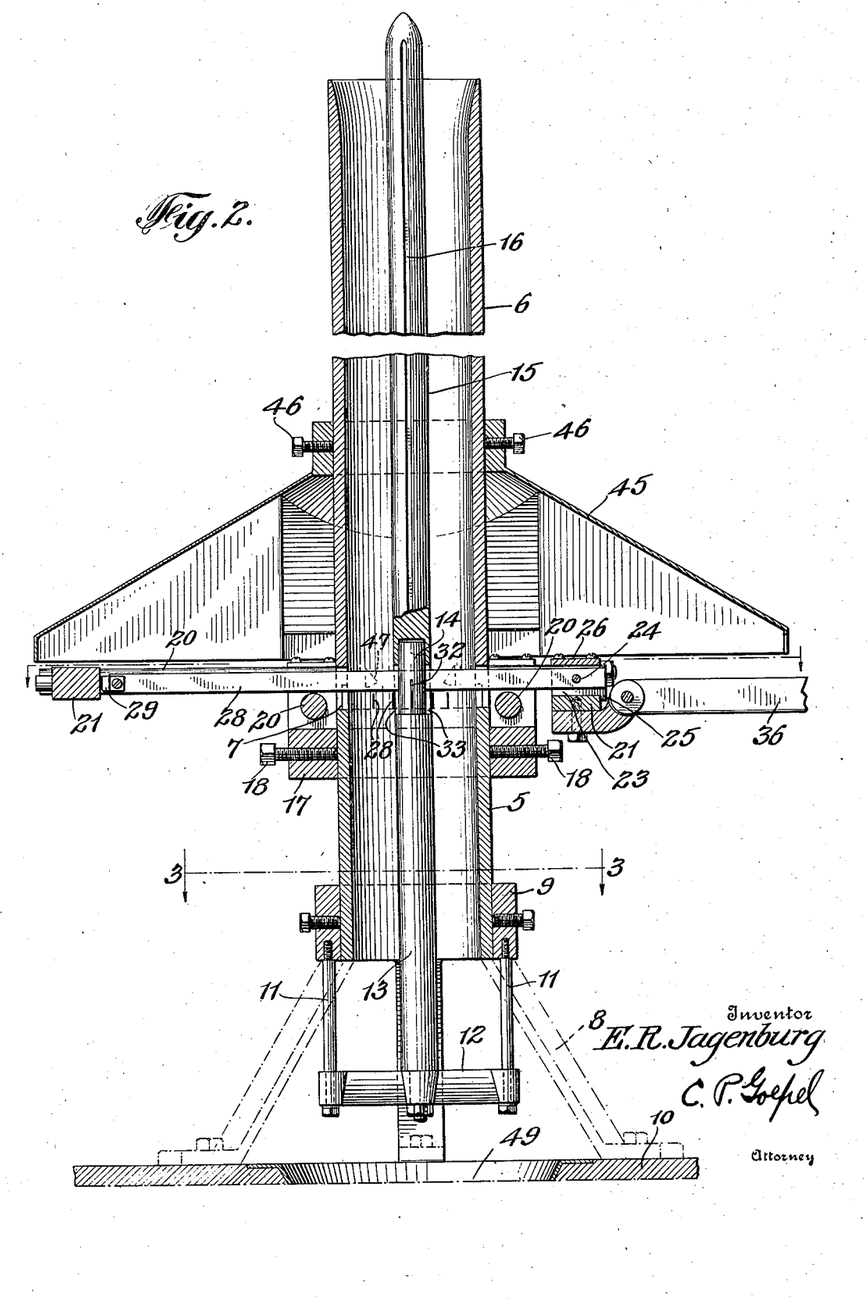
Figure 2 is an enlarged vertical section of the cutting mechanism.
Figure 3:
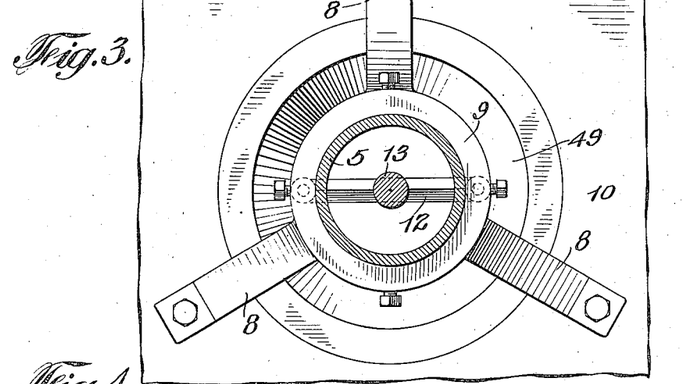
Figure 3 is a section taken on the line 3—3 of Fig. 2.

In the illustrated embodiment of the apparatus, attention may first be confined to the fruit cutting mechanism which constitutes the most essential feature of the present invention. As herein shown, this portion of the apparatus includes a fruit receiving and cutting cylinder embodying a lower section 5 and a relatively long upper section 6 which is separable from said lower cylinder section. These cylinder sections have the same internal and external diameter and are formed at their meeting ends with longitudinally extended annular reduced portions providing a lap joint 7 when the cylinder sections are assembled, as seen in Figure 2 of the drawings.

The lower end of the cylinder section 5 is rigidly though removably held in the annular head 9 of a suitable support 8, said support having a plurality of legs radiating from said head and affixed to the floor or base indicated at 10.

In the supporting head 9 for the cylinder diametrically disposed depending rods 11 are fixed, the lower ends of said rods having secured thereto a horizontally disposed bar 12 of V-shaped form in cross section, said bar having inclined side faces for a purpose to be hereinafter stated. The lower end of a rod 13 extending axially upwardly through the cylinder section 5 is fixed centrally to the bar 12, the upper end of said rod being reduced in diameter as at 14 for telescopic engagement within the lower end of a guide rod 15 which extends axially through the cylinder section 6 and above the upper end thereof. This rod 15 is provided with a longitudinal groove 16 extending substantially the entire length of the rod.

Upon the upper end of the cylinder section 5, a substantially rectangular supporting plate 17 is rigidly fixed by means of the set screws 18. This plate is provided at its corners with upstanding lugs 19 through each of which openings extending at right angles to each other and in vertically spaced planes, are provided. These openings receive the rods 20 of two knife carrying frames which are adapted to be reciprocated in directions at right angles to each other. The rods in each pair support one of the knife carrying frames, which have heads 21, and between these heads of each frame a series of cutting knives disposed in spaced parallel relation to each other extend.

Various means may be provided for connecting the ends of the cutting knives to the frame heads 21. For this purpose, I have herein shown one of the heads 21 of each frame as provided in its upper side and in its intermediate portion with a recess 22. This recess is adapted to receive a plurality of spacing blocks 23 between which the knife ends are engaged. The individual knives are in the form of a flexible ribbon of suitable steel of the requisite width. The spacing blocks 23 and the knife blades arranged therebetween have coinciding openings to receive a tie bolt 24. Each spacing block at one end has a shoulder 25 formed thereon to engage over one side of the frame head 21. A longitudinally extending clamping plate 26 is disposed upon the series of spacing blocks 23 and the ends of the head 21 and is securely fixed to the latter by the screws 27.

The series of cutting knives indicated at 28 are connected at their other ends to independently adjustable devices mounted in the other frame head 21. As shown, the latter end of each flexible knife blade is fixed to one end of an angular lug 29 which is rigidly secured upon one end of a rod 30 extending loosely through an opening in the head 21. The other end of this rod is threaded to receive an adjusting nut 31.

It is obvious that by turning the nut 31 in contact with the outer face of the head 21, the rod 30 is pulled longitudinally through said head and the tension of the thin flexible knife blade adjusted accordingly.

Figure 4:
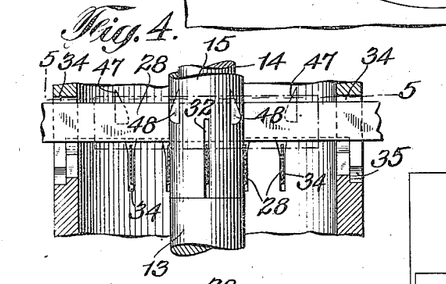
Figure 4 is an enlarged fragmentary vertical section through the meeting ends of the separable parts of the fruit cutting cylinder showing the arrangement of the two series of cutting knives.

As clearly shown in Figure 4 of the drawings, the lapped end portions 7 of the cylinder portions 5 and 6 are provided with diametrically opposed series of slots 34 therein through which the respective series of knife blades 28 are freely movable.

I have herein shown five of the knife blades in each series, but it is obvious that a greater or less number of the blades might be employed. The upper reduced end 14 of the rod 13 is provided with two longitudinal slots 32 therein extending through the rod at right angles to each other. One of these slots receives the central knife 28 of one series of knives while the other slot receives the central knife in the other series.

The lower end of the rod 15 which is bored to receive the upper end of the rod 13 is likewise provided with slots 33 to accommodate the central knife blades. These slots 33, however, open upon the end of the rod 15 so as to permit of the removal of the upper cylinder and the rod 15 without disturbing the cutting knives.

In order to permit of the ready assemblage of the knives and the cylinder sections without injury to the knives, the open ends of the slots 34 are slightly widened or flared as indicated at 35 in Figure 4 of the drawings.

Any preferred operating means may be employed for reciprocating the two series of cutting knives, and for this purpose I have shown a rod 36 pivotally connected to one end of each of the knife carrying frames and having an eccentric connection 37 at their other ends with the shafts 38 and 39 respectively, which are disposed at right angles to each other, and operatively connected by means of the beveled gearing 40. This operating means for the cutting knives is actuated through the medium of a drive belt 41 or other suitable driving connection between the shaft 39 and a counter shaft 42, said counter shaft being driven by the belt 43 from a motor 44.

The cutting knives 28 are protected against possible injury by means of a cruciform hood 45 which is removably fixed to the cylinder section 6 by means of suitable set screws 46.

In the operation of this cutting mechanism, the slices of fruit are piled upon each other in superposed relation within the upper cylinder section 6. In cutting pineapple, for instance, from which the central core has been removed, each slice of the fruit has a central opening. The rod 15 extends through this opening and guides the fruit slice in its downward movement, so that the slices are kept in parallel relation to each other. As the slices of fruit accumulate in the cylinder section 6, the displaced air finds an outlet through the groove 16 in the periphery of the rod 15. In practice the operation of the mechanism is not started until the cylinder section 6 is almost completely filled with the fruit slices, so that there is a sufficient weight of fruit to force the lowermost slice downwardly upon the upper edges of the upper series of the knives 28. However, if additional weight is required, a weight block or disc may be inserted within the cylinder.

Figure 5:
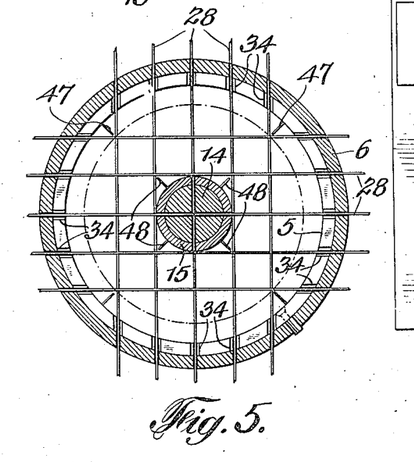
Figure 5 is a horizontal sectional view taken on the line 5—5 of Figure 4.
Figure 6:
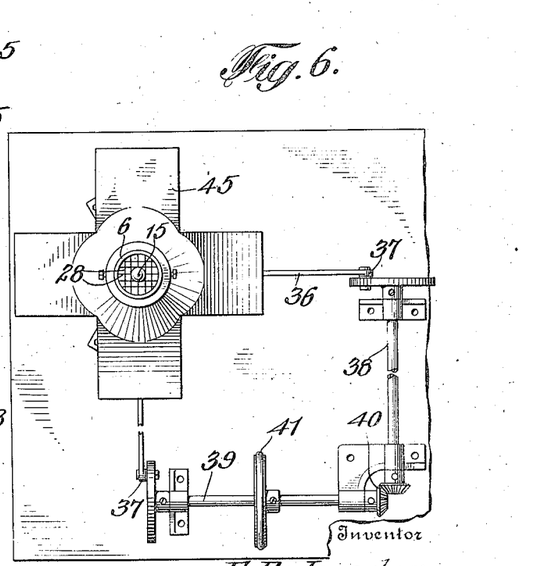
Figure 6 is a top plan view illustrating the operating means for the two series of cutting knives.
Figures 7, 8:
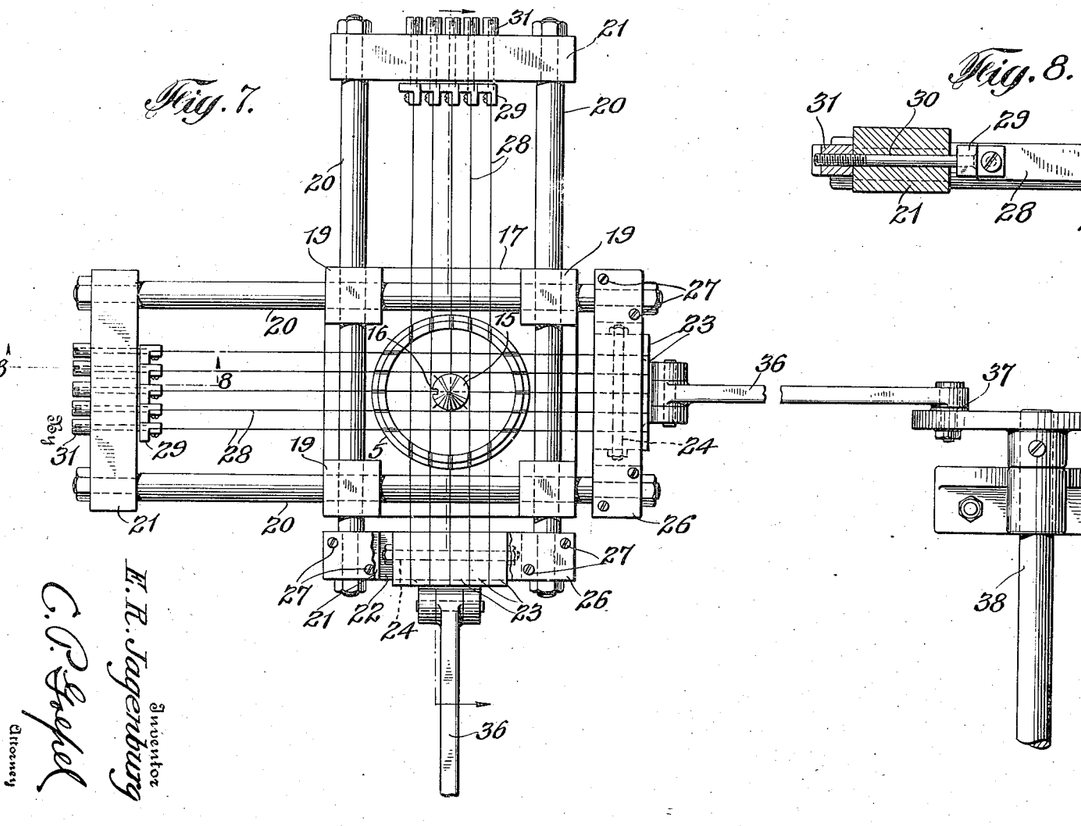
Figure 7 is a plan view of the cutting mechanism, the protecting hood being removed.
Figure 8 is a detail sectional view taken on the line 8—8 of Figure 7 showing the adjusting means for the knives.

Owing to the fact that the fruit pulp consists of minute pulp fibres, if the cutting knives remained stationary, there would be a tendency to disintegrate or shred the pulp, so that it would be reduced to a pulpy mass without definite form or shape. This is overcome by imparting a reciprocating movement to the cutting knives, so that the fibres of the fruit pulp will be cleanly cut. As the fruit slices are cut in one direction by the upper series of knives 28 and before they have completely passed below said knives, they are engaged by the lower series of cutting knives 28 and are cut in the opposite direction thereby producing a multiplicity of fruit cubes or sections of approximately uniform size. Owing to the close relationship of the upper cutting edges of the lower series of knives, to the lower edges of the upper series and the pressure of the superposed fruit slices upon the slice being cut, the latter after being divided by the knives in the upper series has no opportunity to shift or become dislodged before the portions of fruit are engaged by the knives of the lower series and cut into the smaller sections. As indicated in Figure 5 of the drawings, I may provide upon the inner surface of the cylinder section 6, at its lower end, a plurality of radially disposed cutting blades 47, and also smaller blades 48 on the periphery of the rod 15 at its lower end. These blades divide the irregular scrap pieces of fruit into smaller parts, so that they will readily pass through the openings of a grading cylinder, as will be later described.

In Figure 5 I have illustrated one of the fruit slices by the broken circular line, but it is of course obvious that the diameter of these fruit slices will vary to a considerable degree.

Figure 9:
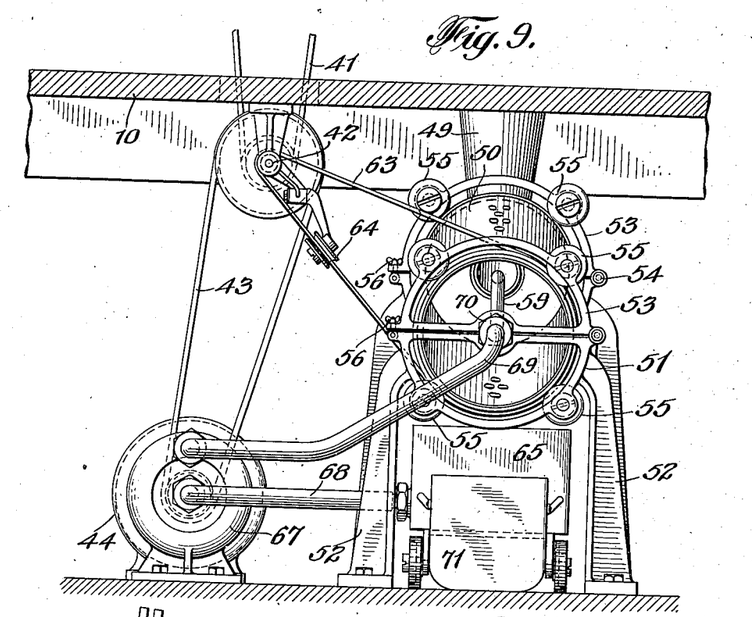
Figure 9 is an end elevation, the cutting mechanism being omitted.
Figure 10:
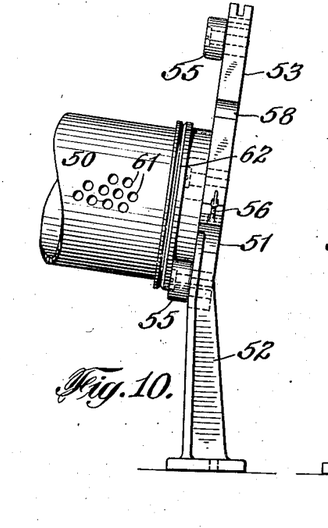
Figure 10 is a detail side elevation illustrating the supporting means for one end of the cylinder and Figure 11 is a detail elevation of the cylinder support showing the upper section thereof swung to an open position to permit of the removal of the cylinder.
Figure 11:
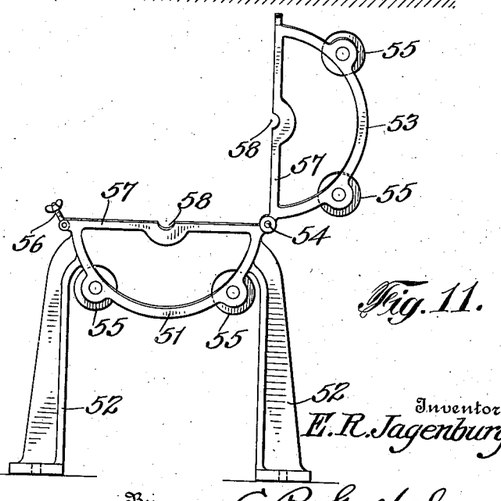

After the fruit has been cut by the reciprocating knives in the manner above described, and the fruit pieces are forced downwardly below the knives by the succeeding slices of fruit, the pieces drop by gravity through the lower cylinder section 5 and are directed by the inclined faces of the horizontal bar 12 outwardly at opposite sides of the axis of the rod 13 and into a hopper 49 fixed at its upper end in the floor 10. The lower end of the hopper is contracted and laterally curved and from the same the pieces of fruit are discharged into the upper open end of a longitudinally inclined grading cylinder 50. This cylinder at its opposite ends is removably and rotatably supported in two similar frames. Each of these frames includes a lower substantially semi-circular section 51 having vertical supporting legs 52 at opposite sides thereof. An upper movable frame section 53 is hinged or pivotally connected to one side of the fixed frame section 51, as shown at 54. Upon the semi-circular curved portion of each frame section a pair of rollers 55 are mounted and when the frame is closed, as shown in Figure 9, these rollers engage at diametrically opposite points upon the periphery of the cylinder 50, thereby supporting the cylinder for rotative movement with a minimum of friction.

Suitable latching means shown at 56 is provided for the purpose of detachably holding the upper frame section against movement relative to the lower section 51 when the machine is in operation.

The sections of the supporting frame for the lower end of the inclined cylinder are each provided with a diametrically extending bar 57, said bars being in superposed relation when the frame is closed and having mating recesses 58 for clamping engagement upon one end of a spray pipe 59 extending axially into the cylinder 50. This pipe is closed at its other end and provided in the underside thereof with a plurality of longitudinally spaced jet orifices 60.

The wall of the cylinder 50 has a multiplicity of spaced openings 61 which may be of any desired size and shape in accordance with the particular size of the fruit pieces. By mounting the cylinder in the manner above explained, it is obvious that a series of interchangeable grading cylinders may be employed.

The cylinder 50 at its lower end is provided with a peripherally grooved annulus 62 to receive a driving belt 63 driven from the counter shaft 42. With this belt 63 a spring held slack take-up roller 64 is engaged. However, any other desired driving means for the grading cylinder might be substituted for the belt 63. Beneath the grading cylinder 50 a wheel supported tank or receptacle 65 is adapted to be positioned. This receptacle in spaced relation to one of its ends is provided with a transverse partition 66 of reticulated material. To one side of the tank between the end thereof and the partition 66 the intake pipe 68 of a centrifugal pump 67 is connected. One end of a flexible tube 69 is connected to the outlet of said pump, the other end of said tube being coupled as at 70, to the spray pipe 59. This spray pipe is securely clamped and held in co-axial relation with the cylinder 50 by the sections 51 and 53 of the support for the lower end of the cylinder, said pipe fitting within the mating recesses 58 of the frame sections. Beneath the lower open end of the grading cylinder 50 a receptacle 71 is positioned to receive the graded cut fruit. An inclined baffle plate 72 is arranged transversely above the partition 66 of the tank 65 and prevents the smaller particles of fruit falling through the openings 61 of the grading cylinder from entering the end portion of the tank to which the pump 67 is connected. Thus only the fruit juices are withdrawn from the tank by the pump 67 and driven under pressure through tube 69 into the spray pipe 59.

In the operation of the apparatus, as above explained, the slices of fruit are piled in superposed relation upon each other within the cylinder 6 and additional slices are fed into this cylinder as the operation proceeds, so that there is at all times substantially the same weight acting upon the lowermost slice of fruit to force the same downwardly through the reciprocating series of knives so that the fruit slices will be cleanly cut. The particles of fruit drop into the hopper 49 from which they are discharged into the upper end of the grading cylinder 50. The larger particles of fruit which are all of substantially uniform size gravitate downwardly through this cylinder to its lower end and fall into the collecting receptacle 71. As the cylinder is continuously rotated the fruit particles are agitated and separated from each other, so that the smaller particles will pass through the openings 61 in the cylinder and drop into the tank 65. The fruit juices also, of course, collect in this tank. These juices are withdrawn from the tank by the pump 67 and sprayed under pressure downwardly in a series of jets from the pipe 59 upon the cylinder wall. Thus the fruit is being continuously sprayed with its own juice, so that the flavor of the particles of fruit which are collected in the receptacle 71 will not be diminished and at the same time the pressure of the jets of fruit juice will act to force the smaller particles of fruit through the openings in the cylinder wall. Thus their separation from the fruit particles of uniform size is effected in a very thorough manner, so that none of these scrap particles of fruit will gravitate through the cylinder and drop into the receptacle 71.

From the foregoing description, considered in connection with the accompanying drawings, the construction, manner of operation and several advantages of the improved fruit cutting and grading apparatus will be readily understood. Of course, in the cutting of fruits which do not have a central core, the rod 15 may be removed. It is also possible to adopt various other arrangements of the series of reciprocating knives so as to cut fruit into particles of a desired size and shape. Owing to the fact that all parts of the apparatus can be very readily disassembled, they may be thoroughly cleansed and kept in a perfectly sanitary condition.

While I have referred to the apparatus as particularly designed for use in supplying fruits to candy manufacturers, it is to be understood that such cut fruits might also be utilized in various other ways than that suggested.

I have above described the novel features of the apparatus with some degree of particularly, but it is manifest that in practice it might be desirable to resort at times to certain structural changes therein. Accordingly, though I have disclosed a practical and satisfactory form of apparatus, the privilege is reserved of embodying the same in various alternative structures and resorting to such changes in the form, proportion and relative arrangement of the several parts as may be fairly embodied within the spirit and scope of the invention, as claimed.

I claim:

1. In a cutting mechanism of the character described, a cylinder comprising a fixed and a removable portion connected together by a lapped joint, two series of reciprocating cutting knives extending transversely of the cylinder at said joint and disposed in vertical intersecting planes, and means for operating said knives.

2. In a cutting mechanism of the character described, a cylinder to receive the material to be cut, comprising a fixed and a removable portion, two series of spaced knives extending through said cylinder in vertical intersecting planes, connections between the portions of said cylinder adjacent to the knives constructed to enable the removable portion to be detached from the fixed portion without disturbance of the knives, and means for simultaneously reciprocating said series of knives.

3. In a cutting mechanism of the character described, two series of reciprocating knives disposed in vertical interesecting planes, a cylinder extending above and below said series of knives, means mounted on the cylinder below the knives for supporting the knives, and means for simultaneously reciprocating said series of knives.

4. In a cutting mechanism of the character described, a tubular member, two frames supported upon said member and disposed at right angles to each other, a series of spaced knives mounted in each frame and disposed in vertical intersecting planes, means operatively connected to said frames for reciprocating the knives and means removably mounted on said tubular member above the reciprocating knives for directing the materials to be cut upon said knives.

5. In a cutting mechanism of the character described, a tubular member, a rod supported centrally therein, two frames mounted on said member for reciprocation in angular directions relative to each other, a series of spaced cutting knives removably mounted in each of said frames and disposed in vertical intersecting planes, means connected to said frames for reciprocating said knives, and means mounted above the reciprocating knives for directing the materials to be cut into contact therewith, said last-named means comprising a tubular member and a central rod detachably mounted on said first-mentioned tubular member and rod respectively.

6. In a cutting mechanism of the character described, two series of spaced knives disposed in vertical intersecting planes, the cutting edges of one series of knives being disposed closely adjacent to the non-cutting edges of the other series of knives, means for simultaneously reciprocating the two series of knives to cut slices of material mainly into pieces of uniform size and shape, and means for cutting pieces of irregular shape into portions of smaller size than those of uniform shape to facilitate the separation of the irregular pieces from the uniform pieces.

7. In a cutting mechanism of the character described, a cylinder to receive the material to be cut, a rod extending axially through said cylinder, two series of spaced cutting knives extending through said cylinder and disposed in vertically intersecting planes, said rod being slotted to receive the central knife in each series, the said rod constituting a guide to position a multiplicity of fruit slices within said cylinder in superposed relation to each other, whereby the lowermost slice is forced under pressure upon the cutting knives and means for simultaneously reciprocating said series of knives.

8. In a cutting mechanism of the character described, a cylinder having a lower fixed section and an upper removable section, two knife carrying frames mounted upon the lower section of the cylinder to reciprocate in directions at right angles to each other, a series of spaced cutting knives in each frame extending through the cylinder in vertically intersecting planes, a central rod disposed through said cylinder to guide a plurality of superposed fruit slices into contact with the cutting knives, additional cutting knives projecting radially from the wall of the cylinder and from the periphery of said rod, and means for simultaneously reciprocating said knife carrying frames.

9. In combination with mechanism for cutting fruit and the like into sections, an inclined grading cylinder and means for directing the cut fruit into one end of said cylinder, said cylinder having spaced openings in its wall, a collecting receptacle arranged beneath the lower end of the cylinder to receive the fruit particles of uniform size therefrom, and means for spraying the fruit juices under pressure against the wall of the cylinder and upon the fruit passing therethrough to eject the smaller particles of fruit through the openings in the cylinder wall.

10. In combination with mechanism for cutting fruit and the like, a longitudinally inclined grading cylinder and means for directing the cut fruit into the upper end of said cylinder, means removably and rotatably supporting said cylinder at its opposite ends, means for rotating the cylinder, said cylinder having a plurality of openings in its wall, and means for spraying the fruit juices under pressure radially within said cylinder to direct the smaller particles of fruit through the openings in the cylinder wall.

11. In combination with mechanism for cutting fruit and the like, a grading cylinder and means for discharging the cut fruit into one end of said cylinder, means for rotatably supporting said cylinder at its opposite ends with its axis at a longitudinal inclination, said cylinder having spaced openings in its wall, means for rotating said cylinder, a spray pipe extending axially into said cylinder and removably held at one end by the cylinder supporting means, and means for supplying the fruit juices under pressure to said spray pipe to direct the juice upon the fruit passing through the cylinder and eject smaller particles of fruit through the openings in the cylinder wall.

12. In combination with a mechanism for cutting fruit and the like, a rotatably mounted longitudinally inclined grading cylinder having spaced openings in its wall, a spray pipe axially disposed within said cylinder, a receptacle arranged below the cylinder to receive the juice and smaller particles of fruit passing through the openings in the cylinder wall and means for supplying the fruit juices collected in said receptacle under pressure to said spray pipe whereby the juices are directed upon the fruit passing through the cylinder and the smaller particles of fruit ejected through the openings of the cylinder wall.

In testimony that I claim the foregoing as my invention I have signed my name hereunder.

EUGENE ROBERT JAGENBURG.